United States Patent [19]

Takao et al.

[11] Patent Number: 4,882,180
[45] Date of Patent: Nov. 21, 1989

[54] SOYBEAN HYDROLYZATE

[75] Inventors: Shoji Takao, Higashikurume; Hiroshi Nakashima, Inagi; Makoto Watanabe, Tama; Makoto Saitoh, Aichi; Kyoko Chiba, Musashino; Kazuo Suzuki, Hachioji, all of Japan

[73] Assignee: Terumo Kabushiki Kaisha, Tokyo, Japan

[21] Appl. No.: 233,900

[22] Filed: Aug. 18, 1988

Related U.S. Application Data

[63] Continuation of Ser. No. 22,538, Mar. 3, 1987, abandoned, which is a continuation of Ser. No. 843,597, Mar. 25, 1986, abandoned.

[30] Foreign Application Priority Data

Mar. 26, 1985 [JP] Japan .................................. 60-61449

[51] Int. Cl.$^4$ .............................................. A23J 3/00
[52] U.S. Cl. ........................................ 426/46; 426/52; 426/656
[58] Field of Search ...................... 426/7, 634, 46, 49, 426/63, 61, 656, 51, 52

[56] References Cited

U.S. PATENT DOCUMENTS 3,640,725  2/1972  Sherba et al. .......................... 426/46
3,694,221  9/1972  Hoer et al. ............................. 426/46
4,482,574 11/1984  Lee ......................................... 426/46

Primary Examiner—Marianne Cintins
Attorney, Agent, or Firm—Cushman, Darby & Cushman

[57] ABSTRACT

A soybean hydrolyzate is disclosed. The hydrolyzate is of a high nutritional value and excellent in protein absorbability. Moreover, it is free from bean-like or grass-like smelling that is characteristic of soybean, as well as from bitter taste. Consequently, the hydrolyzate is very valuable food as protein source.

The hydrolyzate is characterized by that the soluble fraction of the hydrolyzate contains amino nitrogen in an amount in the range from 5 to 20%, preferably from 10 to 15% of the total nitrogen of said fraction. The hydrolyzate is prepared by pulverizing soybean, adding water to the pulverized soybean to form a slurry of a solid content in the range from 1 to 20%, heating the slurry at a temperature from 60° to 100° C. for a period from 5 to 180 minutes, homogenizing the slurry under a high pressure and hydrolyzing the homogenates with a neutral protease produced by *Bacillus subtilis*.

2 Claims, 2 Drawing Sheets

4,882,180

SOYBEAN HYDROLYZATE

This is a continuation of application Ser. No. 022,538, filed Mar. 3, 1987, now abandoned, which is a continuation of application Ser. No. 843,597, filed Mar. 25, 1986, now abandoned.

BACKGROUND OF THE INVENTION

1. Field of the Invention

The present invention relates to a novel soybean hydrolyzate and a process for preparing the same.

The hydrolyzate is a high nutritional value and excellent in protein absorbability. Moreover, it is free from bean-like or grass-like smelling that is characteristic of soybean. It is also free from bitter taste. Consequently, it is valuable food as protein source.

2. Description of Prior Arts

Soybean is a food material rich in proteins, fats and undigestable carbohydrates of good quality, which is highly useful as nutritional supply. The soybean food desirably makes use of entire constituents of soybean grains. For the use of the whole grains of soybean are known two processing methods, a dry process (Japanese Patent Publication No. 48-19946) and a wet process (Japanese Patent Laid Open No. 50-4263). According to the dry process, soybean grains are compressed to such an extent that they are not de-fatted, dried and coarsely divided to remove the seed coat; the remaining seed lobes of the soybean are steam-cooked in a steam cooker while deodorizing odor from the fats and dehydrating water attached to or impregnated in the seed lobes in a short period of time by means of vacuum suction; and then the steam-cooked product is pulverized successively to a medium particle size and to a fine particle size to produce deodorized fine particles of soybean. The heat treatment in the dry process removes unpleasant bean-like and grass-like odors, and further inactivates trypsin inhibitors and nutrition-inhibitory substances such as hemaglutinin contained in the soybean. However, the heat treatment is disadvantageous in that solubility of the protein is much reduced, and its absorbability becomes lower.

According to the wet process, on the other hand, raw seed lobes of soybean are heated so as to soften them and inactivate lipoxydase enzymes, followed by formation of a slurry of the soybean and water, and the slurry is homogenized in a high-pressure homogenizer to produce a soybean drink. Although the wet process allows use of entire constituents of the soybean, the pressure homogenization to a fine homogenate does not produce sufficiently soluble proteins.

In this respect, combination of a treatment with enzymes or microorganisms has been considered in the wet process. However, the use of a protease is associated with formation of peptides with bitter taste, thereby making oral ingestion difficult. In the use of a microorganism there occurs the denaturation characteristic of fermentation. It also requires a considerably long period of reaction time.

SUMMARY OF THE INVENTION

It is an object of this invention to provide a soybean hydrolyzate with entire constituents of the whole grains of soybean and with high absorbability of the protein.

Another object is to provide a soybean hydrolyzate free from bean-like or grass-like smelling and bitter taste of peptides.

A further object is to provide a process for preparing the above-mentioned soybean hydrolyzate.

The aforesaid objects of the invention are achieved by producing a soybean hydrolyzate wherein the soluble fraction of said hydrolyzate contains amino nitrogen in an amount in the range from 5 to 20% (w/w) of the total nitrogen of said fraction.

Furthermore, the objects of the invention are achieved by a process for preparing a soybean hydrolyzate which comprises pulverizing the whole grains of soybean, adding water to the pulverized grains to form a slurry of a solid content in the range from 1 to 20% (w/v), heating the slurry at a temperature in the range from 60° to 100° C. for a period in the range from 5 to 180 minutes, homogenizing the heated slurry under a high pressure and hydrolyzing the homogenate with a neutral protease.

DETAILED DESCRIPTION OF THE INVENTION

Figure 1:
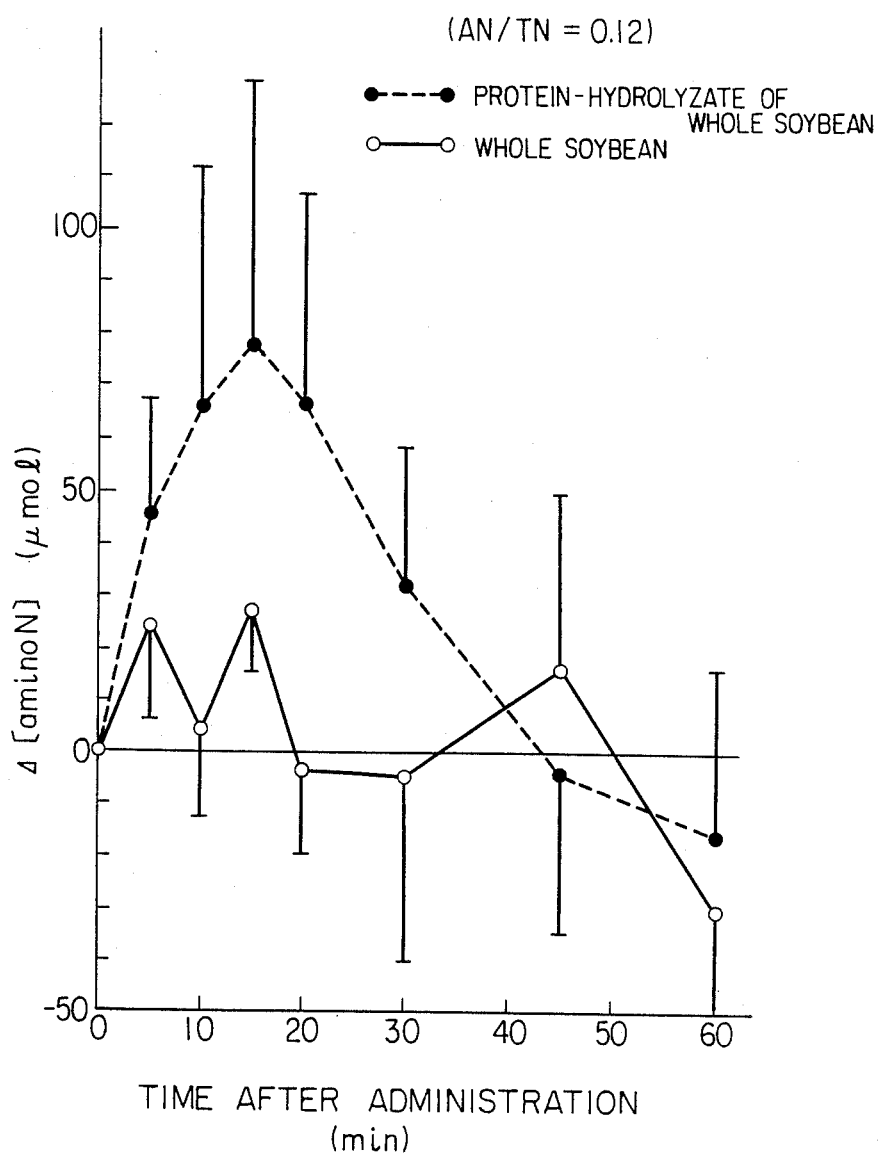
FIG. 1 of the attached drawing is a graphic presentation showing changes with time of the amino nitrogen in the portal vein in Wistar rats after administration of the test materials as described in Test Example 1 below.

The present invention provides a soybean hydrolyzate wherein the soluble fraction of the hydrolyzate contains amino nitrogen in an amount in the range from 5 to 20% of the total nitrogen of said fraction.

The invention also provides a process for preparing the above-mentioned hydrolyzate of soybean which comprises pulverizing the whole grains of soybean, adding water to the pulverized grains to form a slurry of a solid content in the range from 1 to 20% (w/v), heating the slurry at a temperature in the range from 60° to 100° C. for a period in the range from 5 to 180 minutes, homogenizing the heated slurry under a high pressure and hydrolyzing the homogenate with a neutral protease.

The pulverization of soybean may be carried out either by a dry process or by a wet process. As the neutral protease it is preferable to employ an enzyme produced by *Bacillus subtilis* or trypsin. Extent of the hydrolysis with the neutral protease is preferably fixed in such a way that the amount of amino nitrogen of the soluble fraction of the hydrolyzate is in the range from 5 to 20% of the total nitrogen.

The process for preparing the hydrolyzate of the invention will be described below in more details.

First, raw soybean is pulverized and then mixed with water to a slurry of 1–20% solid content. The solid content should be in such range because a concentration exceeding 20% will produce a too high viscosity to maintain fluidity and because the lower limit is fixed so in consideration of the efficiency in subsequent steps. The lower limit is 1% and more preferably 5%.

Next, the slurry is heated at 60°–100° C. for 5–180 minutes and then homogenized under a high pressure (100–800 Kg/cm$^2$). At a temperature in the range from 60° to 100° C. as set forth above, trypsin inhibitors and lipoxygenase in soybean are inactivated. The heating period of time should be 180 minutes or shorter in order to prevent deterioration of the oil in soybean. By homogenation under a high pressure is meant, for example, to throw the pulverized material to a plate under a high pressure to produce finer particles. In practice, it can be done by a high-pressure homogenizer. These steps are carried out in order to convert the pulverized soybean to its homogenate to facilitate hydrolysis of soybean with a neutral protease in the subsequent step, preferably by employing the above-mentioned ranges.

The homogenate prepared as above is subjected to hydrolysis by means of a neutral protease. Selection of the protease employed for the decomposition of proteins in soybean to an appropriate extent is critical in the present invention. If hydrolysis of the proteins to any extent is to be effected, any one of the proteases employed for the treatment of food materials would be utilizable. However, use of an acid or alkaline protease would be encountered with a problem of the salt formation by neutralization treatment. If the salt is water soluble, the product will contain the salt in a large amount. If the salt is insoluble, desalting by means of a solid-liquid separation will be needed with a result that a portion of the food constituents will be lost.

In order to avoid these problems, we have investigated neutral proteases to find the most suitable one and found that a neutral protease produced by *Bacillus subtilis* and trypsin are most preferred both for the taste produced by them and their hydrolyzing activities.

Whereas enzymatic decomposition to a larger extent is more advantageous for higher water solubility and absorbability, it is necessary to restrict the hydrolysis to a certain extent in order to prevent unique bitter taste produced by low-molecular peptides. As a result of investigations we have found that it is preferable to limit the extent of the hydrolysis, in terms of the ratio of amino nitrogen to total nitrogen in the soluble fraction after the enzyme reaction, to the range from 5.0 to 20%, preferably from 10 to 15%. The hydrolyzates in the above-mentioned range have been found to be free from bitter taste and be highly adsorbable. Amino nitrogen as referred to herein is the total amount of nitrogen contained in the amino groups and total nitrogen as referred to herein is the amounts of all the nitrogens contained in the soluble fraction including the amino groups. Determination of the amino nitrogen is made by developing color of the soluble fraction of the above-mentioned reaction mixture with TNBS (trinitrobenzenesulfonic acid) reagent, measuring the absorbance at 420 nm and counting an amount of the amino nitrogen using the working curve using L-leucine. The total nitrogen is determined by the Kjeldahl method.

The invention will be described below in more details by means of examples.

EXAMPLE 1

In a mixer was pulverized 2.0 Kg of the whole grains of soybean (U.S. growth, protein content of 38%) for 2 minutes and the pulverized grains were poured into 10 l of hot water to give a slurry containing the soybean at a concentration of 16.7%. The slurry was maintained at 80° C. for 20 minutes. After cooled, water was added to a total volume of 20 l. The mixture was again triturated in a mixer for 10 minutes. The triturated mixture was homogenized in a high-pressure homogenizer under a pressure of 300 Kg/cm$^2$. To the homogenate was added 1.52 g of an enzyme produced by *Bacillus subtilis* (manufactured by Yamato Kasei K. K., trade name Protin NY), followed by hydrolysis at 50° C. for one hour. The hydrolyzate was heated to 80° C. and then maintained at that temperature for 20 minutes to inactivate the enzyme. The resulting mixture was spray-dried to give 1.8 Kg of a powdery product. To 10 g of the powders was added 60 ml of water thereby rapidly forming dispersion to give a stable emulsion. Supernatant from the emulsion after a centrifugal separation at 3,000 rpm for 10 minutes contained amino nitrogen in an amount of 9% of the total nitrogen in the supernatant.

EXAMPLE 2

Into 15 l of hot water at 80° C. was poured 2.5 Kg of the whole grains of soybean (U.S. growth, protein content of 38%) to a content of soybean in the mixture of 14.3%. The mixture was triturated in a mixer for 20 minutes while maintaining it at 80° C. After triturated, water was added to a total volume of 20 l, and the resulting mixture was homogenized in a high-pressure homogenizer under a pressure of 400 Kg/cm$^2$. To the homogenate was added 10 g of trypsin (manufactured by Difco). The resulting mixture was subjected to a hydrolysis reaction at 40° C. for 3 hours. The reaction mixture was heated to 80° C. and maintained at that temperature for 20 minutes to inactivate the enzyme. The product was then spray-dried to give 2.3 Kg of the nutritional product according to the invention. To 10 g of the powders was added 60 ml of water thereby rapidly forming dispersion to give a stable emulsion. The supernatant from the emulsion subjected to a centrifugal separation at 3,000 rpm for 10 minutes contained amino nitrogen in an amount of 9.2% of the total nitrogen.

In order to demonstrate effects of the hydrolyzates obtained according to the present invention tests were made as described below.

TEST EXAMPLE 1

Protein absorption of the hydrolyzate prepared in Example 1 was examined. Ten Wistar male rats each weighing 250 g fasted overnight were anesthetized and catheterized into the duodenum and the portal vein. After allowing to stand overnight, five of the animals were administered each with 2.5 ml of a 10% solution of the product of the invention, and the remaining five each with 2.5 ml of a 10% solution of the control material prepared in the same way as in Example 1 except that the enzyme treatment step had been omitted. The administration was made through the duodenal catheter, and blood was drawn through the portal vein catheter at intervals up to 60 minutes after the administration.

The blood from the portal vein was promptly subjected to a deproteinization treatment, and the total amount of amino nitrogen in the deproteinized serum by the TNBS method. As shown in FIG. 1, the concentration of amino nitrogen with the test material of the invention markedly increased in 15 minutes after administration thereby demonstrating that the protein in the test material was very rapidly absorbed as compared with the control material.

TEST EXAMPLE 2

Figure 2:
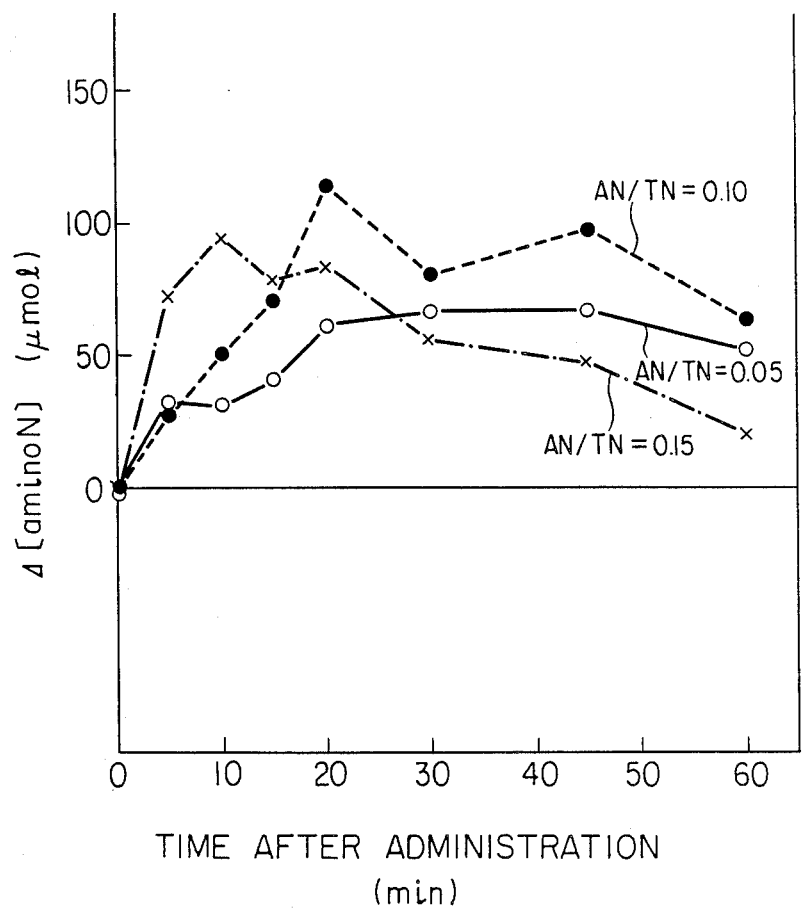
FIG. 2 is a graphic presentation showing changes of the amino nitrogen in the portal vein in rats after administration of test materials with different AN (amino nitrogen/TN (total nitrogen) ratios as described in Test Example 2 below.

Hydrolyzates containing amino nitrogen respectively in ratios of 3, 5, 10, 15, 20 and 25% of the amount of total nitrogen in the soluble fraction of the final hydrolyzate were obtained by changing the amount of the enzyme added and the temperature and time of the hydrolysis in Example 1. Protein absorption of some of these products examined in accordance with Test Example 1 are shown in FIG. 2. As shown in FIG. 2, there was a tendency that greater extent of the hydrolysis (ratio of amino nitrogen to total nitrogen) produced more rapid absorption.

TEST EXAMPLE 3

Table 1 shows the relationship of the extent of hydrolysis with the bitterness of taste and the absorbability. In Table 1 are shown results of the sence test to examine bitterness as well as of the absorption test to examine absorbability in rats as described above. As seen from Table 1, the absorbability is satisfactory when the extent of the hydrolysis, that is, the ratio of amino nitrogen to total nitrogen (AN/TN) is in the range from 5 to 25%. Satisfactory bitterness is produced with the hydrolysis in the range from 5-20%.

TABLE 1

Relationship of the extent of the hydrolysis with the bitterness and the absorbability

| Amino nitrogen/ total nitrogen | Bitterness | Absorbability | Amount of the enzyme | Temperature | Time |
| --- | --- | --- | --- | --- | --- |
| 3% | — | Δ | 0.76 g | 40° C. | 10 min. |
| 5% | — | O | 0.76 g | 40° C. | 30 min. |
| 9% | — | ⊚ | 1.52 g | 50° C. | 1 hr. |
| 15% | — | ⊚ | 7.6 g | 50° C. | 1 hr. |
| 20% | ± | ⊚ | 15.2 g | 50° C. | 3 hrs. |
| 25% | + | ⊚ | 38 g | 50° C. | 10 hrs. |

Notes.
— No bitterness
± A slight bitterness
+ A positive bitterness
Δ Poor absorbability
O Good absorbability
⊚ Very good absorbability From the above results, it may be concluded that both taste and absorbability are satisfactory with a ratio of the amino nitrogen to the total nitrogen in the range from 5 to 20%. Particularly preferable is the range from 10 to 15%.

As described above, there can be produced by simple steps according to the process of the invention soybean hydrolyzates which are excellent in dispersability in water, from a stable emulsion, as well as are excellent in absorbability of the protein constituents and are of little bitter taste.

As a neutral protease is used in the process, no salts are formed by the neutralization treatment thereby requiring no desalting treatment.

When the ratio of the hydrolysis is fixed in the range from 5 to 20%, there are produced soybean hydrolyzates which are of little bitter taste and are of a high absorbability of the protein.

As the soybean hydrolyzates produced according to the present invention is a stable emulsion, it may be taken as it is as a drink or may be used by adding or blending it to or with another food material.

What is claimed is:

1. A process for preparing a soybean hydrolyzate, wherein a supernatant obtained by centrifugal separation of the hydrolyzate contains an amino nitrogen content in the amount in the range from 5 to 20% of an amount of total nitrogen contained in the supernatant, which consists of pulverizing soybean, adding water to the pulverized soybean to form a slurry of a solid content in the range of 1 to 20%, heating the slurry at a temperature from 60° to 100° C. for a period in the range from 5 to 180 minutes, homogenizing the heated slurry under a pressure from 100 to 800 kg/cm$^2$ and hydrolyzing the homogenate with a neutral protease enzyme produced by *Bacillus subtilis* in a sufficient amount of the enzyme to hydrolyze the homogenate.

2. The process for preparing a soybean hydrolyzate according to claim 1, wherein the supernatant contains an amino nitrogen content in an amount in the range from 10 to 15% of an amount of the total nitrogen contained in the supernatant.

* * * * *